Patented Jan. 1, 1935

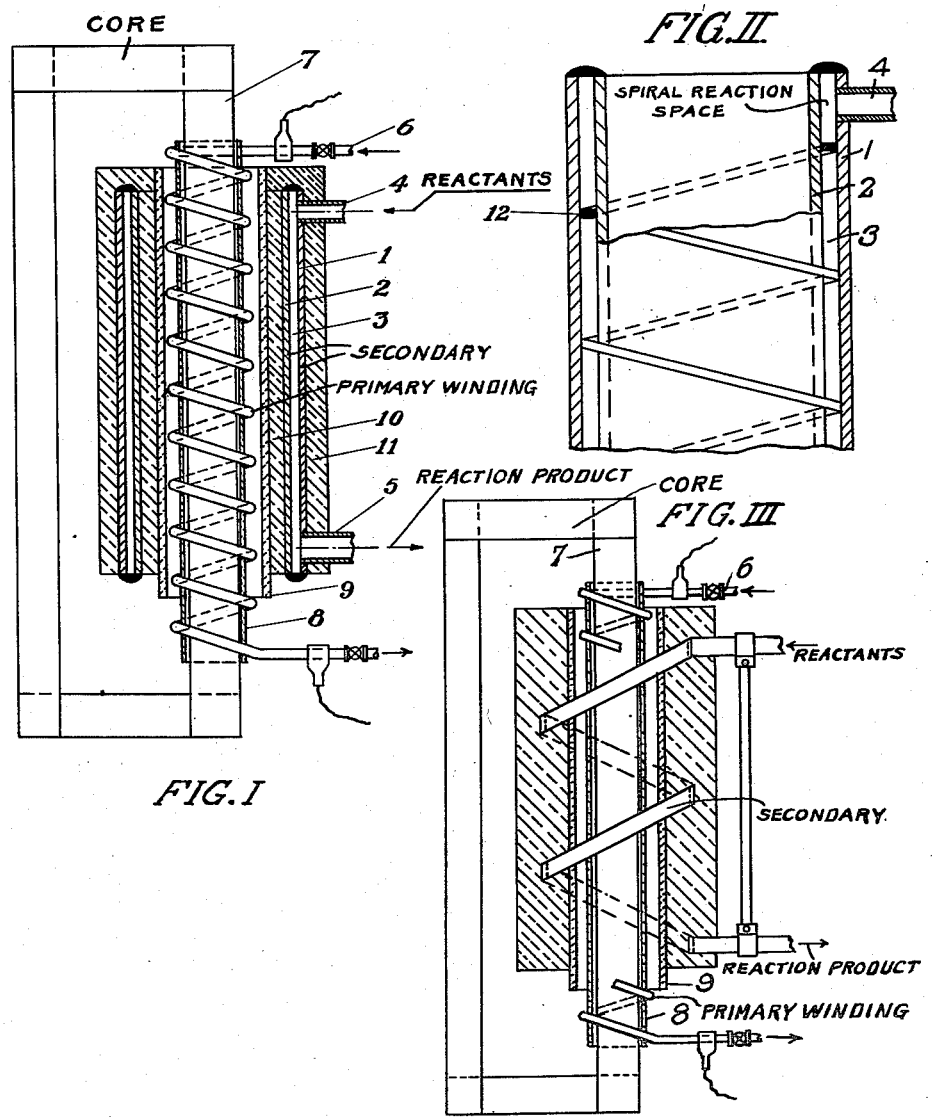

1,986,348

UNITED STATES PATENT OFFICE 1,986,348

APPARATUS FOR EFFECTING GAS REACTIONS

Burritt Samuel Lacy, Red Bank, and Harlan A. Bond, Metuchen, N. J., assignors, by mesne assignments, to E. I. du Pont de Nemours and Company, a corporation of Delaware Application June 13, 1931, Serial No. 544,050

7 Claims. (Cl. 23—288)

This invention relates to new and useful improvements in effecting gas phase reactions and particularly those endothermic catalytic reactions which require a large amount of heat to be supplied to the reactants prior to or during the reaction.

There are many reactions occurring in the gaseous phase in which a large heat input is necessary, either because the reaction is endothermic, or because the materials have to be raised to an elevated temperature to initiate the reaction, or for both reasons. On a small scale, or in a slow reaction, the desired result can usually be effected by an external heating device; for example, by heating the external surface of the reaction vessel by some suitable means, such as flame gases or an externally applied electrical heating element.

Flame heating and the like produces uneven temperature distribution and is not readily controllable to give the optimum reaction temperature. External electrical coils require insulation when applied to the usual metallic reaction vessels, and tend to burn out when heated sufficiently to pass the necessary heat through the insulation, and the heat transmitted by the insulation tends to vary considerably at different points. Direct electrical heat using the apparatus as part of the circuit is impracticable, on account of the fact that the low electrical resistance of the heating vessel necessitates a fractional or at least very low voltage to be used, and this in turn necessitates enormously large connectors to transmit the low voltage current from the step-down transformer to the ends of the reaction vessel.

One object of our invention is to furnish a satisfactory method of carrying on catalytic gas reactions requiring a heat input which is very large, which must be readily controlled within narrow temperature limits, and wherein one must maintain a substantially uniform temperature in any section taken at right angles to the direction of flow of reaction gas. A further object is to provide a compact, substantial, simple apparatus for conducting such reactions. Other objects will hereafter be apparent.

The invention comprises furnishing the necessary heat to the reactants by making the walls of the reaction chamber itself the closed secondary circuit of a step-down transformer, heat being generated in the walls by electrical induction. The reaction spaces lie between these walls and are preferably of small cross-section, that is, restricted, so that a high linear flow of reactants as well as uniform temperature and high heat transfer are facilitated.

The invention will now be further described, by way of example, in terms of manufacturing hydrocyanic acid from formamide according to the following equation:

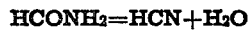
$$HCONH_2 = HCN + H_2O$$

This reaction is highly endothermic, requiring about 29,000 g. cals. of heat per mole of formamide to produce HCN, in addition to that required for heating up the reaction materials to the temperature of the reaction; so that the total necessary heat input may be around 37,000 g. cals. per mole of formamide vapor passed in at 200°. This main reaction must be carried out rapidly, lest undesirable side reactions such as

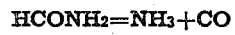
$$HCONH_2 = NH_3 + CO$$

occur, and the temperature must be carefully controlled to avoid temperature irregularities which also deleteriously affect the reaction. This main reaction is catalytic, and certain metals, viz; brass, aluminum, copper and others are very effective catalysts.

Now it is known that the transfer of heat from solid surfaces to gases and vice-versa is materially more satisfactory by increasing the linear velocity of the reactant gas past the heating surface. The rate of heat transfer is thus increased; in general this increases in the coefficient of heat transfer varies with about the eight-tenths power of the linear velocity of the gas.

We have now found a similar relation holds for catalytic reactions, the velocity of which depends both upon the rate of heat transfer and upon the catalytic activity, in that the latter as well as the former, increases largely with increase of linear velocity. We believe the turbulence produced by the increased gas velocity over the surface of the catalyst may assist in removing the film of reacted gas adjacent to the catalyst surface and thus permit contact with fresh molecules of the unconverted gas or gases. From our discovery it is evident that not only high space velocities but a high linear velocity as well is a very desirable condition in processes for conducting endothermic catalytic reactions such as the decomposition of formamide cited above.

It should be noted that high linear velocity is not merely another aspect of the use of narrow reaction spaces, which last determines what may be called the surface factor; but on the contrary, with a given narrow reaction space the use of a high linear velocity gives better results, that is, the linear velocity is a variable independent both of space velocity and the surface factor.

Referring to the accompanying drawing, Fig. I shows diagrammatically a cross-section of an apparatus suitable for carrying out the invention. Fig. II shows an enlargement of the reaction chamber in cross-section. In these figures, 1 and 2 are concentric metal cylinders joined at the ends, as by brazing, to form the narrow annular chamber 3. Metal pipes 4 and 5, are connected to chamber 3. Cylinders 1 and 2 form the closed secondary of a step-down transformer. A spiral, water cooled metal pipe, 6, is wound around laminated iron core 7, and forms the transformer primary situated within cylinder 2. Electrical insulation 8 lies between core 7 and pipe 6. Electrical insulation 9 separates pipe 6 and core 7 from the cylinders 1 and 2 as does heat insulating shell 10. A further layer of heat insulation 11 is placed around the outside of cylinder 1. In Fig. II, spiral baffles 12, winding from end to end of the annular reaction space 3, subdividing chamber 3, are more clearly shown.

By regulating the voltage drop across the primary conductor 6, the number of turns of 6 around core 7, and the cross section thickness of 1 and 2 together with their length and the material from which they are constructed, which will determine their specific electrical resistance, any desired electrical heat may be induced in cylinders 1 and 2 and therefore be directly available in chamber 3.

When the desired temperature and rate of heat input is attained, formamide vapor is passed into chamber 3 by way of pipe 4 and the hydrocyanic acid, water and other off-gases withdrawn by way of pipe 5.

It is evident that the size of the apparatus, the electrical voltage and frequency available, the material from which the apparatus is constructed and the rate at which the reaction is carried out, as well as insulation problems, make it essential to experimentally determine within certain limits the most favorable operating conditions. This is common practice in art of this nature and is within the skill of one who is familiar with chemical and electrical operations of this kind. Accordingly, it will be understood that the following examples are given by way of illustration and are not intended to limit the scope of the invention to the specific details described therein.

*Example.*—An apparatus was constructed as in Fig. I wherein concentric cylinder 1 was approximately 10 inches internal diameter and 24 inches long with cylinder 2 of such diameter as to give an annular clearance of 3/32 of an inch; the metal forming the cylinders was of brass. A primary E. M. F. of about 36 volts was applied to 6 which consisted of a copper pipe of 3/8" inside diameter wound in 52 turns around a cruciform shaped laminated iron core 7 of 3¾ sq. in. cross section. Electrical insulation 8, a pressed mica tube of 4" inside diameter and ¼" thick, was inserted between pipe 6 and the iron cross 7. Spiral baffle 12, was wound at 3" intervals along the reaction chamber 3. The voltage developed in the secondary was about 1/10 volt and the electrical heat liberated amounted to about 10 kilowatts. The temperature in the walls of cylinders 1 and 2 within the reaction chamber 3, and the reacting gases was maintained at about 600° C. Formamide vapor was fed through inlet pipe 4 at a rate of about 700 lbs. in 24 hours, that is, at a space velocity of about 6,000 per hour. The linear velocity of gas through the reaction space was about 35 ft. per second. The off-gases withdrawn from pipe 5 during the same period contained, beside some unreacted formamide, 340 lbs. of hydrocyanic acid, the yield being equivalent to about 82% of the total formamide passed into the reaction zone.

We have found that heat may be developed very uniformly, and at a very high rate within the reaction chamber of the above apparatus and that the transfer therefrom to the reactant gases is rapid and efficient. The formamide vapor may be heated up rapidly from say the temperature of about 200–300° C., at which it may be introduced, to the desired reaction temperature, such as 400 to 800° C. The formation of undesirable by-products, for example,

$$HCONH_2 = NH_3 + CO$$

is largely prevented since the reactant gases are rapidly and uniformly raised to the higher temperatures where the desired formation of HCN and water predominate over the above undesired ammonia and carbon monoxide formation.

We have found that the production of HCN from formamide proceeds at reaction temperatures of from 300 to 800° C. but we prefer to work at temperatures from about 400 to 700° C. The reaction may be carried out at varying space velocities and we have found that with the apparatus described above space velocities may be varied from a few hundred volumes to 20,000 or more volumes of formamide vapor per reaction chamber volume per hour. The linear velocity of gas past the contact surface may be maintained at 10,000 to 100,000 or even 500,000 ft. per hour, referred to the volume of the formamide vapor when calculated for standard conditions (0° C. and 760 mm. pressure). The reaction may also be carried out at increased or diminished pressure as well as in the presence of diluent gases which do not adversely affect the reaction. The heat supplied to the chamber will depend on the reaction temperature and the gas speed and is attained by regulating the voltage and specific electrical characteristics of the apparatus. With the furnace as described, we found no difficulty in supplying 100 kilowatts or more to the reactant gases.

The illustrative apparatus has been described as having a brass reaction chamber; it is known however, that other materials are suitable for the catalytic conversion of formamide to hydrocyanic acid and water, among which we may mention, iron, copper and aluminum.

This apparatus may also be constructed of non-catalytic metals. Any metal which does not adversely effect the reaction and has suitable thermal conductivity and stability and electrical properties is serviceable since it is possible to produce or enhance the catalytic action by introducing catalytic materials within the reaction chamber walls for example, as metal shavings or in the form of pumice impregnated with a catalytic material such as bauxite or thoria. The reaction chamber walls are therefore not necessarily catalytic although this is the preferred embodiment of the invention.

Placing baffles within the reaction chamber as shown in Fig. II increases the contact area and the linear velocity of the gas mixture and thereby facilitates the reaction velocity but this is not a necessary feature of this invention.

Several connected or independent reaction chambers similar to 3 might be used to replace 3. It is also possible to replace the annular chamber formed by the two concentric cylinders by one or more flattened metal spirals, for example, brass tubing which will then serve as the secondary and reaction chamber. Such modifications are likewise included in this invention. A suitable apparatus is shown in Fig. III.

By way of illustration, the invention has been described in terms of the manufacture of hydrocyanic acid from formamide. It is not however, restricted thereto, since any reaction carried out at high temperatures in the gaseous phase which requires a high heat input and a close control of temperature and which may be advantageously carried out by preserving a uniform temperature gradient and avoiding hot spots, may also be carried out in the manner described. By way of further illustration, the following may be cited in which the approximate amount of heat absorbed in each reaction is indicated.

1. The conversion of ethyl alcohol to ethylene and water according to the following equation:

$$C_2H_5OH = C_2H_4 + H_2O - 8000$$

2. The production of hydrocyanic acid and methyl alcohol from methyl formate and ammonia, as follows:

$$NH_3 + HCOOCH_3 = HCN + H_2O + CH_3OH - 39000$$

3. The production of hydrocyanic acid from ammonia and ethylene:

$$NH_3 + C_2H_4 = HCN + CH_4 + H_2 - 17000$$

4. The production of formaldehyde from methyl alcohol according to the reaction:

$$CH_3OH = CH_2O + H_2 - 25000$$

5. The production of acetaldehyde from ethyl alcohol according to the following:

$$C_2H_5OH = C_2H_4O + H_2 - 8000$$

6. The decomposition of various hydrocarbons such as propane and isobutane:

$$C_3H_8 = C_2H_4 + CH_4 - 18000$$

In addition to those advantages already indicated, the process and apparatus of this invention gives particularly good results because of the uniformity of induction heating. Measurements in actual tests indicate a variation of less than 5–10° C. in the temperature of the metal walls in any plane at right angles to the gas flow. This prevents destruction of the catalyst which is often inactivated by overheating in usual processes of this nature.

While this invention is applicable to general gas heating and reaction devices, it is of specific applicability to highly endothermic reactions. For illustration of the differences the decomposition of formamide as described above is typical. This reaction requires a supply of about 37,000 g. cals. of heat per gram molecular volume of formamide vapor introduced at around 200° C. in order to carry out the reaction at 600° C. On the other hand, merely to heat up the same volume of air from 200° to 600° C. requires only about 2800 g. cals. i. e. only 1/13th as much heat. Furthermore, in heating up air there is no necessity for limiting the size of the heating zone used for a given air rate; while the gas reactions described herein must be carried out rapidly, and the products quickly removed and cooled, in order to avoid large losses by side reactions, which therefore necessitates furnishing a relatively enormous and controllable amount of heat in a small space.

We claim:

1. Heating device comprising a step down transformer having a closed single turn secondary electrical circuit consisting of two concentric metal tubes having annular gas passages therebetween said secondary surrounding the core and primary and heat insulated therefrom.

2. Heating device comprising a step down transformer, with a hollow cooled primary winding and a core, and having a closed single turn secondary electrical circuit surrounding said primary and core, and heat insulated therefrom, said secondary consisting of two concentric metal tubes having annular gas passages therebetween.

3. An apparatus for carrying out high temperature, endothermic, gas phase reactions comprising in combination a hollow, uninsulated primary winding of a step down transformer surrounding a laminated core, a hollow, single turn, closed secondary circuit adapted to be heated by means of a primary electric current induced therein by magnetic lines of force from the primary circuit, said secondary surrounding said primary and said core, and heat insulated therefrom and gas inlet and outlet ports to the reaction space within said secondary.

4. An apparatus for carrying out high temperature, endothermic, catalytic, gas phase reactions comprising in combination a hollow cooled primary winding of a step down transformer surrounding a core and a single turn closed secondary electric circuit consisting of two concentric metal cylinders having annular gas passages therebetween, said secondary surrounding said core and said primary and spaced therefrom, said metal cylinder being composed of a metal catalytic to the reaction.

5. An apparatus for carrying out high temperature, gas phase reactions comprising in combination a hollow, water-cooled, helical, primary winding of a step down transformer surrounding an electrically insulated core and a single turn closed secondary electric circuit surrounding the core and primary and said secondary consisting of two concentric brass cylinders having annular gas passage therebetween, said annular passage containing a spiral baffle system, gas inlet and outlet ports to said annular passage, and said secondary being heat insulated on the outside and from the primary and core.

6. An apparatus for carrying out high temperature endothermic gas phase reactions comprising in combination a hollow uninsulated primary winding of a step down transformer surrounding a laminated core, a hollow closed secondary circuit adapted to be heated by means of primary electric currents induced therein by magnetic lines of force from the primary circuit, said secondary surrounding said primary and said core, gas inlet and outlet ports to the reaction space within the secondary and said secondary surrounded by heat insulating material.

7. An apparatus for carrying out high temperature, gas phase reactions comprising in combination a hollow, water-cooled, helical, primary winding of a step down transformer surrounding an electrically insulated core and a closed, hollow, secondary electric circuit having a helical gas passage, surrounding the core and primary, gas inlet and outlet ports to said hollow secondary, and said secondary being heat insulated on the outside and from the primary and core.

BURRITT SAMUEL LACY.
HARLAN A. BOND.